United States Patent [19]

Kubik et al.

[11] 4,215,682

[45] Aug. 5, 1980

[54] MELT-BLOWN FIBROUS ELECTRETS

[75] Inventors: Donald A. Kubik, Houlton, Wis.; Charles I. Davis, Cottage Grove, Minn.

[73] Assignee: Minnesota Mining and Manufacturing Company, Saint Paul, Minn.

[21] Appl. No.: 875,614

[22] Filed: Feb. 6, 1978

[51] Int. Cl.$^2$ .............................................. A62B 7/10
[52] U.S. Cl. ................................... 128/205.29; 55/103; 55/131; 55/528; 55/155; 55/DIG. 35; 55/DIG. 39; 361/226; 425/174.8 E; 264/22; 128/206.19
[58] Field of Search .................. 128/146.2, 146, 146.6; 55/103, 131, 528, 155, DIG. 33, DIG. 35, DIG. 39; 361/226; 425/174.8 R, 174.8 E, 38, 3; 264/22

[56] References Cited

U.S. PATENT DOCUMENTS

| | | | |
|---|---|---|---|
| 2,464,301 | 3/1949 | Francis, Jr. | 428/167 |
| 2,466,906 | 4/1949 | Miller | 264/24 |
| 2,491,889 | 12/1949 | Bennett et al. | 65/11 W |
| 2,740,184 | 4/1956 | Thomas | 431/327 |
| 2,810,426 | 10/1957 | Till et al. | 264/24 |
| 3,003,304 | 10/1961 | Rasmussen | 57/32 |
| 3,016,599 | 1/1962 | Perry, Jr. | 428/338 |
| 3,333,585 | 8/1967 | Barghini et al. | 128/146.2 X |
| 3,456,156 | 7/1969 | Kilby et al. | 260/325 |
| 3,490,115 | 1/1970 | Owens et al. | 28/103 |
| 3,571,679 | 3/1971 | Van Turnhout | 361/233 |
| 3,644,605 | 2/1972 | Sessler et al. | 264/22 |
| 3,724,174 | 4/1973 | Walkenhorst | 55/DIG. 35 X |
| 3,824,052 | 7/1974 | Fowler | 425/83 |
| 3,860,369 | 1/1975 | Brethauer | 425/3 |
| 3,971,373 | 7/1976 | Braun | 128/146.2 |
| 3,998,916 | 12/1976 | Van Turnhout | 264/22 |
| 4,042,740 | 8/1977 | Krueger | 428/138 |
| 4,069,026 | 1/1978 | Simm et al. | 55/131 X |
| 4,148,595 | 4/1979 | Bednarz | 425/174.8 E |

FOREIGN PATENT DOCUMENTS 1337753  11/1973  United Kingdom .............. 55/DIG. 39

OTHER PUBLICATIONS

Pillai et al., NASA Technical Report R-457, Dec. 1975.
Van Turnhout, "The Use of Polymers for Electrets", Journal of Electrostatics, vol. 1, (1975), pp. 147-163.

*Primary Examiner*—Henry J. Recla
*Attorney, Agent, or Firm*—Cruzan Alexander; Donald M. Sell; Roger R. Tamte

[57] ABSTRACT

A persistent electric charge is introduced into melt-blown fibers during the melt-blowing process. When these charged fibers are incorporated into fibrous webs, they provide unique properties, including improved filtering properties.

18 Claims, 6 Drawing Figures

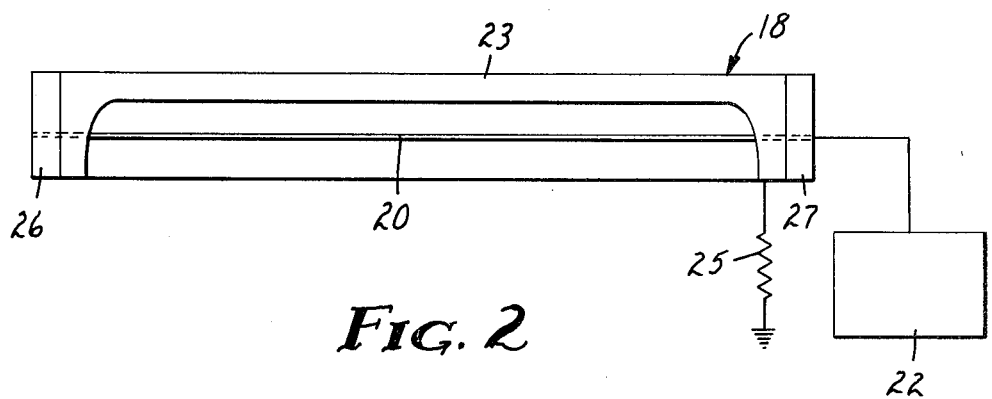
FIG. 2
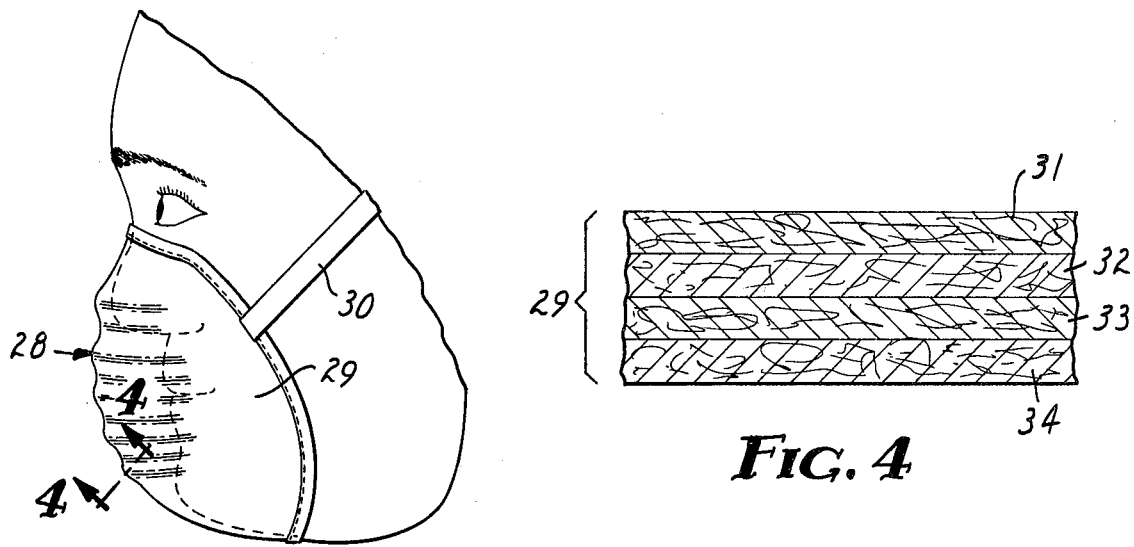
FIG. 3
FIG. 4
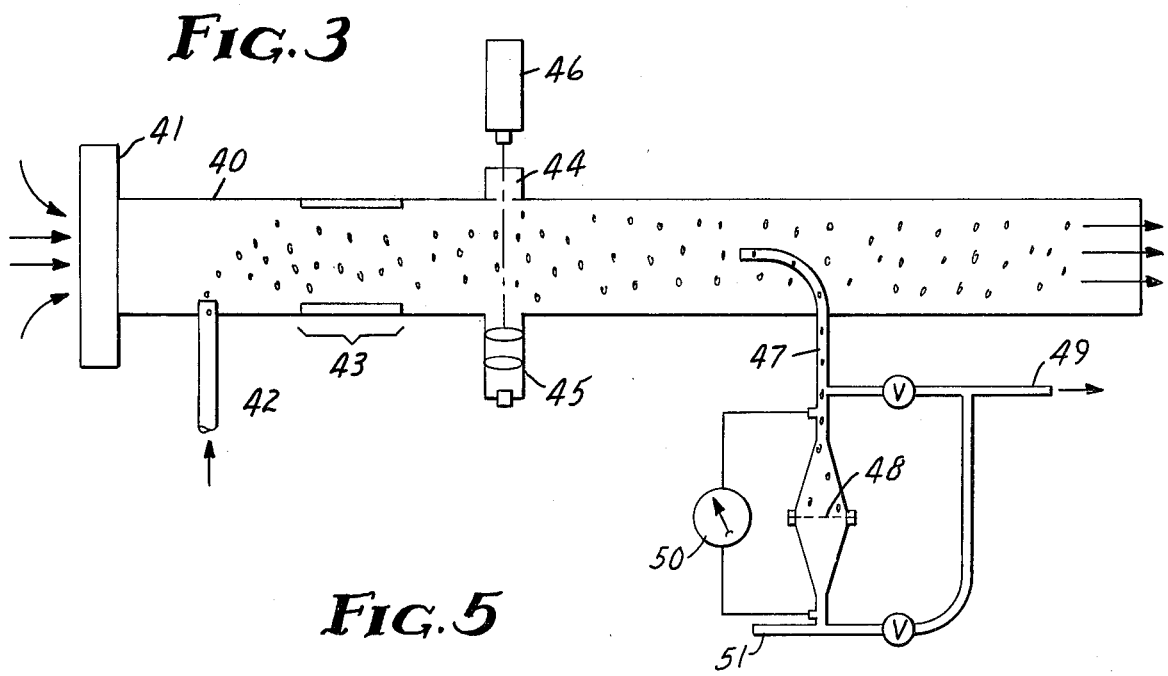
FIG. 5

MELT-BLOWN FIBROUS ELECTRETS

INTRODUCTION

The present invention provides a new kind of fibrous electret, which may be conveniently and economically manufactured in an essentially one-step process, and which can comprise fibers of microscopic diameters, thereby providing a unique combination of electret and microfiber properties.

In an early method for forming fibrous electrets taught in Thomas, U.S. Pat. No. 2,740,184, thermoplastic threads, filaments, fabrics, or sheets are disposed in an electrostatic field established between parallel, closely spaced electrodes. The fibrous material is heated to soften it and then cooled in the presence of the field, whereupon "more or less" permanent charges are introduced into the fibers.

Van Turnhout, U.S. Pat. No. 3,571,679, notes a drawback to this method in that it is difficult to introduce a reasonably high permanent charge into a fibrous web being treated, because voltages of the magnitude needed for such a high charge cause arcing through the open pores of the fibrous web. Accordingly Van Turnhout suggests covering the charging electrodes with a poorly conductive sheet so as to distribute the applied voltage and dampen possible dielectric breakdown through the fibrous web.

The covered-electrode method is criticized in a later Van Turnhout patent, U.S. Pat. No. 3,998,916, on the ground that too long a time period is needed to charge the fibrous material to a desirably charged state. As an alternative, the 3,998,916 Van Turnhout patent proposes a different multi-step procedure in which a web or film of high molecular weight material is first stretched and then electrically charged, then fibrillated by passing it over needled rollers, and then assembled in layers to form a fibrous web.

This reliance on film-formation to form fibers is part of a historical sequence in which the art has progressed from preparation of rather thick wax electrets to thinner films by use of polymeric materials and techniques which include several controls over the process, including for example, controls over the temperature of the film during charging; controls over the distance between the charging apparatus and the film; and controls over the time period of charging. In the 3,998,916 Van Turnhout patent, (see also "The Use of Polymers for Electrets," J. Van Turnhout, *Journal of Electrostatics*, Volume 1 (1975), pages 147–163) electric charging of the film is achieved by heating the film to near its melting point, stretching it over a curved plate, and spraying it with positive or negative charges from a number of thin wires disposed above the curved plate. In Sessler et al, U.S. Pat. No. 3,644,605, a thin polymeric film is supported over a coextensive dielectric plate and bombarded with an electron beam. And in NASA Technical Report R-457 (December, 1975), a spray or mist of liquid dielectric is passed through the corona discharge from a brush electrode or from a grid of narrow wires and then collected on a dielectric sheet where the droplets harden as a film.

While formation of a fibrous web by the intermediate formation of a film benefits from the knowledge of film-charging techniques, it has other significant disadvantages. Forming a fibrous web by steps that include extruding or casting a film, processing the film to first charge and then fibrillate it, and assembling layers of fibrillated film into an integral web is a time-consuming and expensive process. Further, the technique can only achieve limited fiber sizes.

Such disadvantages, and the disadvantages of the listed earlier techniques for forming charged fibrous webs, are overcome by the new fibrous electrets of the present invention, which are based on melt-blown fibers. Melt-blown fibers are fibers prepared by extruding molten fiber-forming material through a plurality of orifices into a high-velocity gaseous stream where the extruded material is attenuated to form a stream of fibers. According to the invention, melt-blown fibers are bombarded as they issue from the orifices with electrically charged particles such as electrons or ions. The fibers are collected at a point remote from the orifices where they have cooled to a solid fibrous shape-retaining form and where they are found to carry a persistent electric charge. The collected web or mat can be used directly, except, typically, for trimming or cutting to size.

The conditions under which a method of the invention must be performed are in sharp contrast to the controlled conditions which have been possible in past methods for forming film electrets: the fibers are moving at extremely high speeds; they are blown turbulently by the high-velocity gaseous stream; and they are enveloped and dispersed in large volumes of diluting, high-velocity air. Still, the electrically charged particles enter the fiber stream and are retained in useful amounts in the melt-blown fibers. Injection of the particles into the fiber stream necessarily occurs during the small fraction of a second (less than one millisecond) when the fibers are both near the source of the electrically charged particles and are in a molten or near-molten stage. After such injection the fibers solidify extremely rapidly, and thereby freeze the electrical charges into the fibers, where they provide the collected mass of fibers with a persistent electric charge.

The persistent charge in fibrous webs of the invention is distinctive from the temporary charge that has been applied to other fibrous products in the past, often as an aid to manufacture of the product. For example, such charges have been applied to assist coating of the fibers by an oppositely charged liquid (see Bennett et al, U.S. Pat. No. 2,491,889); or to improve the distribution and separation of the fibers and to draw them toward a collector, thereby providing a more uniform fibrous mat (see Miller, U.S. Pat. Nos. 2,466,906; Till et al, 2,810,426; Fowler, 3,824,052; Rasmussen, 3,003,304; and such fibrillated strand patents as Owens et al, U.S. Pat. Nos. 3,490,115; and Kilby et al, 3,456,156).

The charges applied in these manufacturing procedures are only temporary in nature, because, for example, the fiber-forming material does not have sufficient volume-resistivity, or too much conductive solvent is present in the formed fibers, to allow a permanent charge to be maintained; or the charge is applied after the fibers have been formed so that only a surface charge is applied; or the charging conditions, such as the applied voltage, are insufficient to develop a permanent charge; or the charge is neutralized after collection of the fibers. If any residue of such a temporary charge remains after manufacture of fibrous mats according to the listed references, it is rapidly dissipated during storage or usage.

By contrast, the fibrous webs of the present invention carry a persistent or "permanent" charge. When stored under typical conditions, fibrous webs of the invention can retain a useful charge for many years. Under accelerated testing, such as storage in a room-temperature 100-percent-relative-humidity environment, the charge on fibrous webs of the invention generally has a half-life of at least one week, and preferably of six months or a year. With such a persistence of charge, fibers and fibrous webs of the invention can properly be termed electrets, and the terms "fiber electrets," "fibrous web electrets," or the more general "fibrous electret" will be used herein to describe them.

For many fibrous web electrets of the invention a good indication of the magnitude of charge can be made by measuring surface voltage in the web with an isoprobe electrostatic voltmeter. However, such a measurement is less accurate if a web comprises a mixture of oppositely charged fibers. A mixed-charge web is still useful, for example, for enhancing filtering properties, but the net charge measured on the web will not represent the full magnitude of the charge. For fibrous web electrets of the invention that carry a persistent charge of only one sign, the charge is generally measured as at least $10^{-8}$ coulombs per gram of melt-blown fibers. For fibrous web electrets that include both positively and negatively charged fibers, the net charge will usually be at least $10^{-9}$ coulombs per gram of melt-blown fibers. An indication of electric charge can also be obtained with other tests, such as application of toner powder to the web, but not necessarily in numerically quantified measurements.

The melt-blown charged fibers prepared according to the invention can be tailored to have a desired fiber diameter. For many purposes, the fibers are in microfiber sizes (i.e., of a size best viewed under a microscope), and for some applications, the smaller in diameter the better. For example, the microfibers can average less than 25, 10, or even one micrometer in diameter.

Microfiber sizes are known to achieve several useful properties, including improvement in certain aspects of filtering; and the combination of microfiber sizes with a permanent electric charge gives fibrous web electrets of the invention unique filtering properties. One particularly significant use for fibrous web electrets of the invention is in respirators, especially in cup-like shaped face masks as shown in FIG. 3. Use of fibrous web electrets of the invention to replace the webs of melt-blown microfibers used in previous masks of the type shown can improve filter efficiencies by a factor of two or more. Masks of the invention of the type shown in FIG. 3 can be inexpensively manufactured, and their low cost and high efficiency offers a widespread utility not available with any other known face masks.

DESCRIPTION OF THE DRAWINGS

FIG. 2 is an elevational view along the lines 2—2 of FIG. 1, and includes a schematic wiring diagram for a source of electrically charged particles included in the apparatus of FIG. 1;

FIGS. 3 and 4 show a representative face mask that incorporates a fibrous web electret of the present invention, FIG. 3 being a perspective view showing use of the mask, and FIG. 4 being a sectional view along the lines 4—4 of FIG. 3;

FIG. 5 is a schematic diagram of an apparatus for testing the filter properties of a fibrous web electret of the present invention.

DETAILED DESCRIPTION

Figure 1:
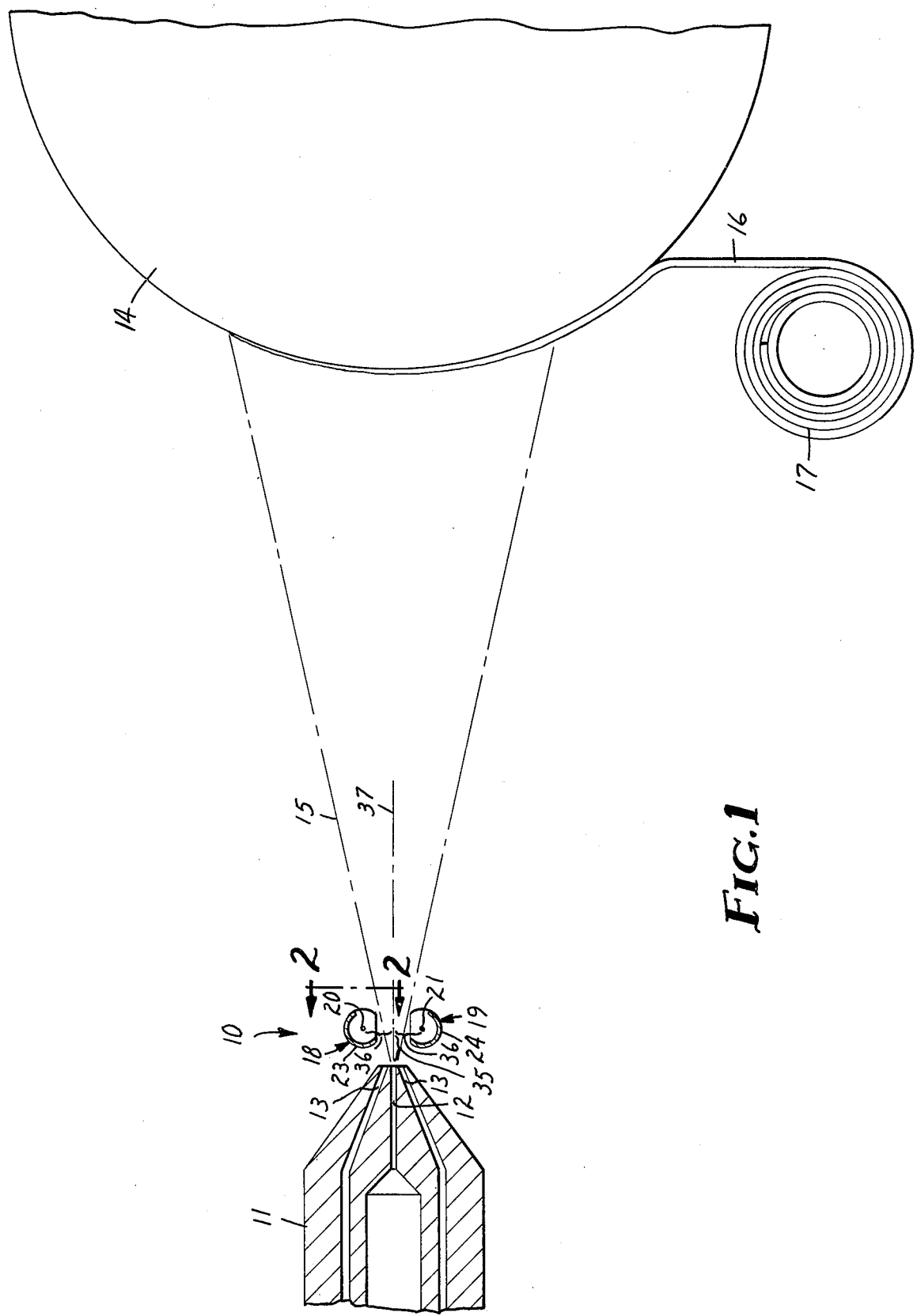
FIG. 1 is a schematic view of representative apparatus for forming a fibrous web electret of the present invention.

FIGS. 1 and 2 show a representative apparatus 10 for preparing fibrous web electrets of the present invention. A portion of this apparatus can be conventional melt-blowing apparatus of the type described in Report No. 4364 of the Naval Research Laboratories, published May 25, 1954, entitled "Manufacture of Super Fine Organic Fibers" by Wente, V. A.; Boone, C. D.; and Fluharty, E. L. Such a fiber-blowing apparatus includes a die 11 which is formed with a row of narrow side-by-side orifices 12 for extruding molten material, and with slots 13 on each side of the row of orifices through which a gas, usually air, is blown at high velocity. The stream of gas draws out the extruded material into fibers; cools the fibers to a solidified form; and carries the fibers to a collector 14 as a fiber stream 15. The collector 14 shown in FIG. 1 comprises a finely perforated screen arranged as a drum or cylinder, but the collector can also take other forms such as a flat screen or a closed-loop belt traveling around rollers. Gas-withdrawal apparatus may be positioned behind the screen to assist in deposition of fibers and removal of gas. The stream 15 of blown fibers is deposited on the collector as a randomly intertangled coherent mass which is handleable as a mat 16 that may be unwound from the collector and wound into a storage roll 17.

To bombard electrically charged particles at the melt-blown fibers, one or more sources of such particles is placed adjacent the die orifices 12. In the apparatus of FIGS. 1 and 2, two sources 18 and 19 are used, one on each side of the fiber stream 15. Each source comprises an electrical conductor 20 or 21 connected to a high-voltage source 22, and disposed within a metal shell 23 or 24 which is connected through a resistor 25 to ground. As shown in FIG. 2, the conductors can be mounted in insulators 26 and 27. Upon energization of the conductor at a voltage high enough (usually 15 kilovolts or more), a corona forms around the conductor, and the air or other gas around the conductor ionizes. The electrically charged ions or particles are propelled into the fiber stream by a combination of aerodynamic and electrostatic forces acting on the charged particles. The flow of charged particles may be assisted by a fan or by use of a voltage on the shells 23 or 24 which propels the particles away. Instead of a cylindrical shell or tube, flat metal plates positioned on each side of the conductor can be used, or any other arrangement which establishes a desired voltage gradient between the electrode and the surrounding shield. Alternative sources of electrically charged particles are electron beams and radiation sources, such as X-ray guns.

The sources 18 and 19 of electrically charged particles are placed close to the lip of the die 11, where the fibers are in a molten or near-molten stage. Under such conditions, the mobility of the free charge carriers within the fibers is high, and introduction of a charge into the fibers is facilitated. The closer the source of electrically charged particles to the lip of the die, the more molten the fibers are, and the easier it is to introduce the charge.

As the fibers solidify and cool, the bombarded charges become frozen into the fibers and the fibers become persistently charged (heating the fibers will remove the charge). In accordance with the common terminology of electrets, this charge is called a homocharge, and it has the same sign as the voltage applied to the conductors. Either a positive or negative voltage may be applied to the source of electrically charged particles, and sources of opposite signs may be used simultaneously, as on opposite sides of the fiber stream.

A static charge on the surface of the fibers (which may be opposite in sign to that bombarded) may also develop during production of a web of the invention, but such a charge will quickly decay, in the same manner as the decay of a static charge applied to a completed fibrous web.

The temperature of the gas around the fibers tends to decline rapidly with increasing distance from the die orifice. For example, for conditions as described in Example 1 where the temperature of the air at the die orifice is about 550° F. (290° C.), the temperature will be about 370° F. (190° C.) a half inch from the die, about 300° F. (150° C.) an inch from the die, about 240° F. (120° C.) one and one-half inches from the die, and about 200° F. (95° C.) two inches from the die. Thus, charges bombarded at the molten or near-molten fibers near the die lip rapidly become frozen into the fibers.

A variety of polymeric materials having dielectric properties that permit electrically charged particles to remain in the fiber without draining away of the charge may be used to prepare blown fibers in webs of the invention. Polypropylene, which has a volume-resistivity of approximately $10^{16}$ ohm-centimeters, is especially useful, and other polymers such as polycarbonates and polyhalocarbons that may be melt-blown and have appropriate volume-resistivities under expected environmental conditions may also be used. In general, the useful polymeric materials have a volume-resistivity of at least $10^{14}$ ohm-centimeters, and avoid absorption of moisture in amounts that prevent the desired half-life for the charge. Pigments, dyes, fillers, and other additives may be mixed into the polymeric material, if they do not remove needed properties of, for example, resistivity.

The diameter of the blown fibers prepared varies with such parameters as the size of the die orifice, the viscosity of the polymeric material, and the velocity of the air stream. Blown microfibers are generally regarded as discontinuous, though their aspect ratio (the ratio of length to diameter) should approach infinity to allow preparation of useful webs. Some workers estimate the fiber lengths to be up to several inches (i.e., 10 centimeters or more).

The fiber-forming procedure may be modified to introduce other fibers or particles into the web. For example, Braun, U.S. Pat. No. 3,971,373, describes apparatus and procedures for introducing solid particles into a blown fiber web. A wide variety of particles are useful, particularly for filtering or purifying purposes; illustrations include activated carbon, alumina, sodium bicarbonate, and silver, which remove a component from a fluid by adsorption, chemical reaction, or amalgamation; and such particulate catalytic agents as hopcalite, which catalyzes the conversion of a hazardous gas to a harmless form. The particles may vary in size, at least from 5 micrometers to 5 millimeters in average diameter. For respirators, the particles generally average less than 1 millimeter in diameter.

Preformed fibers may also be introduced into a blown fiber web during formation of the web; see, for example, Perry, U.S. Pat. No. 3,016,599, and Hauser, U.S. Ser. No. 848,488, filed Nov. 4, 1977, now issued as U.S. Pat. No. 4, 118,531. For example, staple fibers, including crimped staple fibers, can be added to a stream of melt-blown fibers (in the case of crimped staple fibers by picking the crimped fibers from a web by means of a lickerin roll) to form a more open or porous web, having reduced pressure drops but good filtering properties.

Many other additions or variations in the basic melt-blowing process are possible. For example, melt-blown fibers may be collected in a pattern of compacted and low-density regions, see Krueger, U.S. Pat. No. 4,042,740. Also, collected webs of melt-blown fibers may be further processed, e.g., by chopping to form fibers useful for inclusion in other products; by compacting in a pattern (see Francis, U.S. Pat. No. 2,464,301); by spraying or otherwise adding ingredients to the web; by laminating the web to other webs or sheet products; or by shaping or cutting the web.

FIGS. 3 and 4 illustrate a convenient configuration and construction for face masks in which fibrous web electrets of the invention may be used. The mask 28 includes a generally cup-like shaped member 29 which is adapted to fit over the mouth and nose of a person, and a strap 30 for supporting the mask. The edge of the mask tends to fit rather closely to the contours of the face and thus defines the air inlet to the wearer of the mask; i.e., most of the air breathed by a wearer of the mask must pass through the mask. The cup-shaped member may comprise an inner non-woven web of air-laid fibers 31, two layers 32 and 33 of fibrous web electrets of the present invention, and an outer non-woven web 34 of air-laid fibers.

The invention will be further illustrated by the following examples. Two different tests used in the examples for testing filtration capability of the prepared webs—one using dioctylphthalate droplets (DOP test), and the other using silica dust in a test established by the National Institute for Occupational Safety and Health (NIOSH silica dust test)—are described in detail in the Federal Register, Title 30, part 11.

EXAMPLES 1–8

Blown microfibers were prepared from polypropylene resin (Hercules "Profax 6330") on apparatus as illustrated in FIG. 1. Conditions for Examples 1, 2, 4–6 and 8 were as follows: The die was 20 inches wide; the temperatures of, respectively, the melt in the die, the die itself, and the air expelled from the die, were 346° C., 370° C. and 400° C. The air pressure at the die was 0.43 kilogram per square centimeter and the polypropylene was extruded at a rate of 15 pounds per hour. The die lip was 60 centimeters from the collector; the distance 35 in FIG. 1 from the die lip to the conductors was 3 centimeters; and the distance 36 between the center-line 37 of the fiber stream and conductors 20 or 21 was 2.5 centimeters. A voltage of 15 kilovolts was applied to each of the conductors 20 and 21 and a voltage of 3 kilovolts was applied to the shells 23 and 24. For Examples 3 and 7 all the conditions were the same except that the melt temperature was 360° C., the air temperature was 370° C., and the air pressure was 0.5 kilogram per square centimeter. Webs were prepared in varying thicknesses and varying weights as listed in Table I. Most of the examples included a positively charged web (indicated by a + in the table below and made by applying a positive voltage to both electrodes 20 and 21 in FIG. 1), a negatively charged web (−), and an uncharged or comparative web (C). Pressure drop (ΔP) and particle penetration (%P) as measured by the DOP test are given in Table I.

TABLE I

| Example No. | Basis Weight (grams/sq. meter) | ΔP (millimeters of water) | % P (percent) |
|---|---|---|---|
| 1+ | 0.29 | 0.6 | 61 |
| 1− | 0.30 | 0.6 | 60 |
| 1 C | 0.32 | 0.8 | 83 |
| 2+ | 0.25 | 0.9 | 51 |
| 2− | 0.25 | 0.7 | 65 |
| 2 C | 0.25 | 0.7 | 80 |
| 3+ | 0.26 | 0.9 | 54 |
| 3− | 0.26 | 0.9 | 58 |
| 3 C | 0.28 | 1.0 | 78 |
| 4+ | 0.33 | 1.1 | 44 |
| 4− | 0.33 | 1.2 | 53 |
| 4 C | 0.32 | 1.1 | 70 |
| 5− | 0.45 | 0.8 | 61 |
| 5 C | 0.45 | 0.7 | 81 |
| 6+ | 0.52 | 1.1 | 46 |
| 6− | 0.52 | 1.3 | 52 |
| 6 C | 0.52 | 1.3 | 73 |
| 7+ | 0.52 | 1.1 | 44 |
| 7− | 0.52 | 1.2 | 53 |
| 7 C | 0.52 | 1.1 | 70 |
| 8− | 0.65 | 2.1 | 32 |
| 8 C | 0.65 | 2.1 | 55 |

EXAMPLES 9–12

Masks as shown in FIGS. 3 and 4 were prepared from webs of Examples 1−, 1+, 2+ and 3+. Results in the NIOSH silica dust test are given in Table II.

TABLE II

| Ex. No. | Initial Inhalation (millimeters of water) | Final Inhalation (millimeters of water) | Final Exhalation (millimeters of water) | Particle Penetration (milligrams) |
|---|---|---|---|---|
| 9 | 7.9 | 13.9 | 9.3 | 1.39 |
| 10 | 8.1 | 14.7 | 10.0 | .66 |
| 11 | 11.6 | 16.6 | 16.4 | .19 |
| 12 | 12.0 | 17.8 | 13.8 | .23 |

Charge Decay Tests

The decay of the charge on the fibrous web electret of Example 6+ over a period of time was tested by storing samples of the web in polyethylene containers at normal room conditions. The charge decay was determined by measuring the surface voltage with a Monroe isoprobe electrostatic voltmeter and using the relationship between charge and surface voltage (Q=CV, where Q is charge, C is capacitance, and V is surface voltage) to calculate the effective surface charge density. Table III shows the proportion between the initial surface charge and the surface charge measured at various time intervals.

TABLE III

| | Proportion of Surface Charge Retained After Days of Storage | | |
|---|---|---|---|
| Example No. | 100 Days | 200 Days | 325 Days |
| 6+ | 0.96 | 0.94 | 0.94 |

In addition, measurements were made of the decay in charge for samples of the Example 6+ and 6 C webs after storage in a desiccator at 20° C. and 100 percent relative humidity. The samples were placed in the desiccator 120 days after their manufacture. The proportion of surface charge retained after different periods of exposure is shown in Table IV.

TABLE IV

| | Proportion of Surface Charge Retained After Days of Storage | | | | |
|---|---|---|---|---|---|
| Example No. | 5 Days | 10 Days | 25 Days | 100 Days | 180 Days |
| 6+ | | | 0.99 | 0.98 | 0.97 |
| 6 C | 0.35 | 0.15 | 0.1 | | |

In addition to tests on the decay of surface charge, the change in particle penetration through an Example 6+ web after various periods of storage in a 100-percent-relative-humidity environment was measured, and the results are shown in Table V. The measurements were made on an apparatus 39 as shown in FIG. 5. Air entering a 3-inch-diameter aerosol transport tube 40 is passed through an absolute filter 41 to insure that background particle concentration is held to a minimum. The challenge aerosol is injected downstream of the absolute filter at an inlet 42, and passed through a section 43 where, if necessary, the aerosol can be neutralized using a krypton-85 radiation source. The challenge aerosol was a fumed silica dust as described in the NIOSH silica dust test.

The output of the aerosol source is monitored with an aerosol photometer 44 which is mounted on the transport tube. The aerosol photometer employs a photodiode 45 to measure the forward scattered light from particles which pass through the beam from a helium neon laser 46. The amount of scattered light is related to the aerosol concentration if the size distribution of the aerosol population is constant with time. A sample of the aerosol is drawn from the main aerosol stream through conduit 47 and passed through the test filtration media 48. With appropriate valving, the size and concentration of the challenge particles ranging from 0.15 to 3 micrometers are monitored upstream and downstream of the filtration media using a Particle Measuring System ASAS-200 Aerosol Spectrometer connected to conduit 49. Continuous measurements are made of the pressure drop across the filter (by a pressure gauge 50), the dewpoint temperature as measured in the conduit 51, and the air temperature. The data obtained from this test instrument enables description of filter penetration as a function of particle size rather than on a mass basis.

Figure 6:
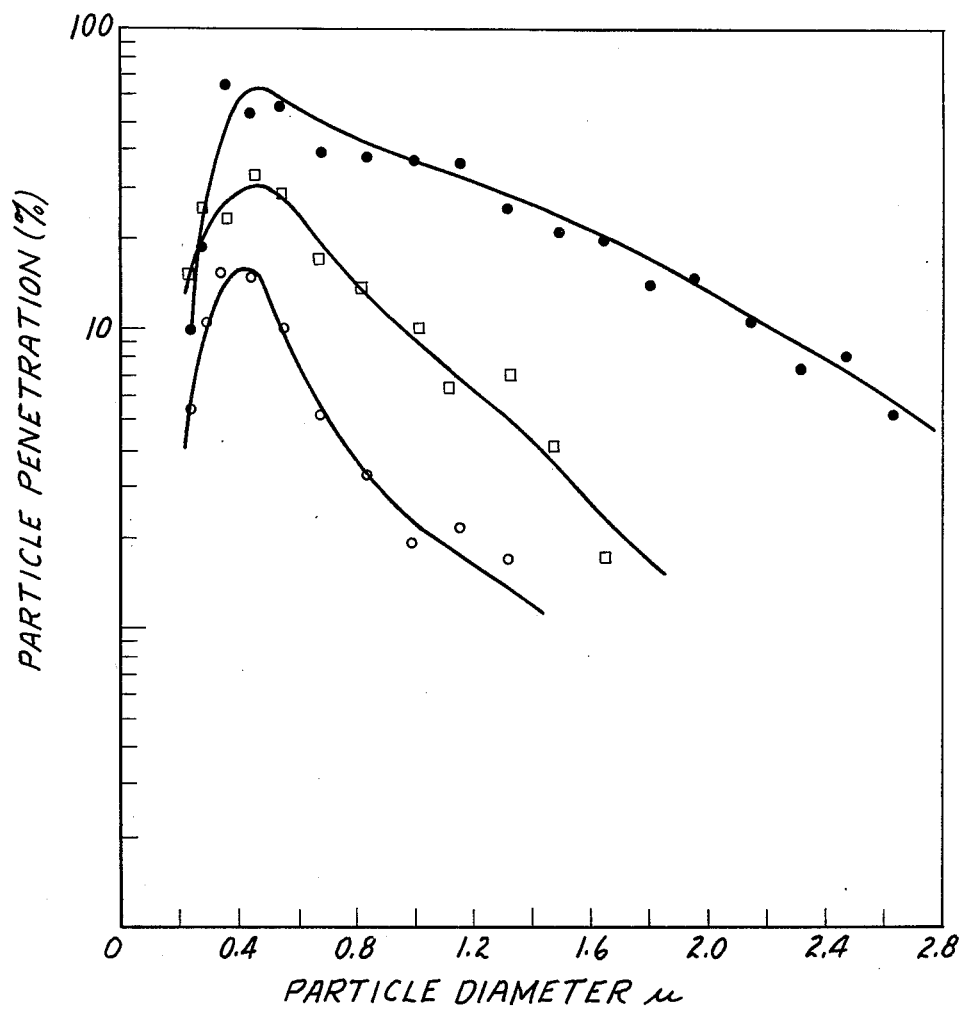
FIG. 6 is a plot of particle penetration versus particle size for fibrous web electrets of the present invention and comparative uncharged webs.

Typical penetration results on the apparatus of FIG. 5 for the webs of Examples 3+ (squares), 6+ (circles) and 6 C (solid dots) are shown in FIG. 6. A peak in particle penetration occurs in the particle size range of 0.3 to 0.6 micrometers, where neither diffusion on inertial deposition are very effective. However, as seen, fibrous web electrets of the invention provide an improvement for all of the particle sizes.

As noted above, Table V shows penetration results in the apparatus of FIG. 5 after the test webs had experienced different lengths of exposure in a 100-percent-relative-humidity environment. The results reported in Table V are cumulative particle penetrations measured for particles less than a given diameter (0.3 micrometer, 1 micrometer and 3 micrometers); i.e., the result reported in the column headed "3 micrometers" is the percentage of particles up to 3 micrometers in size that penetrated through the test web; the result reported in the column headed "1 micrometer" is the percentage of particles up to 1 micrometer in size that penetrated, etc.

TABLE V

| Days of Exposure In 100-%-R.H. | Cumulative Mass Penetration in Percent at Different Particle Sizes | | |
|---|---|---|---|
| | 0.3 micrometer | 1 micrometer | 3 micrometers |
| 0 | 0.012 | 0.24 | 2.4 |
| 1 | 0.019 | 0.30 | 3.3 |
| 7 | 0.008 | 0.34 | 3.0 |
| 30 | 0.009 | 0.24 | 1.7 |
| 180 | 0.008 | 0.29 | 2.6 |

What is claimed is:

1. A fibrous web electret comprising melt-blown fibers prepared by extruding molten fiber-forming material through orifices into a high-velocity gaseous stream where the extruded material is drawn out into fibers and solidified in the fibrous form, said fibers having electrically charged particles and a persistent electric charge that is useful to enhance filtering properties of the web, said charge having a half-life of at least one week in a room-temperature, 100-percent-relative-humidity environment.

2. A fibrous web electret of claim 1 in which said melt-blown fibers comprise polypropylene.

3. A fibrous web electret of claim 1 in which said melt-blown fibers average less than about 25 micrometers in diameter.

4. A fibrous web electret of claim 1 which further includes staple fibers interspeersed with said melt-blown fibers.

5. A fibrous web electret of claim 1 which further includes particles dispersed in the web.

6. Filter apparatus comprising support structure for supporting a filter web across a stream of fluid that is to be filtered, and a fibrous web electret of claim 1 supported by said structure.

7. A respirator comprising support structure for mounting the respirator on a person, and filter means through which air is drawn from the ambient environment to the mouth and nose of a person wearing the respirator, said filter means including a fibrous web electret of claim 1 disposed so as to filter air drawn into the respirator.

8. A respirator of claim 7 which comprises a cup-like member adapted to fit over the mouth and nose of a person wearing the respirator, and in which at least a layer of said cup-like member comprises the fibrous web electret of claim 1.

9. A fibrous web electret comprising a coherent mass of randomly intertangled melt-blown microfibers which average less than 10 micrometers in diameter, said microfibers being prepared by extruding molten fiber-forming material through orifices into a high-velocity gaseous stream where the extruded material is drawn out into fibers and solidified in the fibrous form, said microfibers having electrically charged particles in an amount sufficient to provide a persistent electric charge of at least $10^{-8}$ coulombs per gram of said microfibers, with a half-life of at least six months in a room-temperature, 100-percent-relative-humidity environment.

10. A fibrous web electret of claim 9 in which said melt-blown microfibers comprise polypropylene.

11. A fibrous web electret of claim 9 which further includes staple fibers interspersed with said melt-blown fibers.

12. A fibrous web electret of claim 9 which further includes particles dispersed in the web.

13. Filter apparatus comprising support structure for supporting a filter web across a stream of fluid that is to be filtered, and a fibrous web electret of claim 9 supported by said structure.

14. A respirator comprising support structure for mounting the respirator on a person, and filter means through which air is drawn from the ambient environment to the mouth and nose of a person wearing the respirator, said filter means including a fibrous web electret of claim 9 disposed so as to filter air drawn into the respirator.

15. A respirator of claim 14 which comprises a cup-like member adapted to fit over the mouth and nose of a person wearing the respirator, and in which at least a layer of said cup-like member comprises the fibrous web electret of claim 9.

16. A method for forming a melt-blown fibrous web electret comprising
   (1) extruding molten fiber-forming material that exhibits a volume resistivity of at least $10^{14}$ ohm-centimeters through a plurality of orifices into a high-velocity gaseous stream where the extruded material is attenuated to form a stream of fibers;
   (2) bombarding electrically charged particles at said stream of fibers as the fibers issue from the orifices wherein the fibers are both near the source of the electrically charged particles and are in a molten or near-molten state; and
   (3) collecting said fibers at a point sufficiently remote from the orifices for the fibers to have cooled to a solid fibrous shape-retaining form.

17. A method of claim 16 in which staple fibers are introduced into said stream of fibers after the stream has been bombarded with charged particles.

18. A method of claim 16 in which particles are introduced into said stream of fibers after the stream has been bombarded with charged particles.

* * * * *